Sept. 3, 1957 R. M. KOVEL 2,805,162
TEA PACKAGE
Filed Oct. 25, 1954
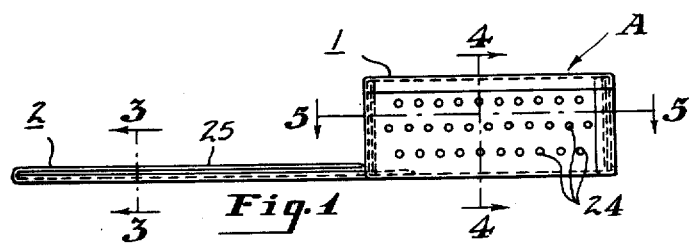
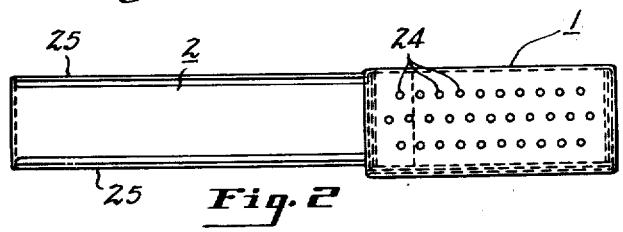
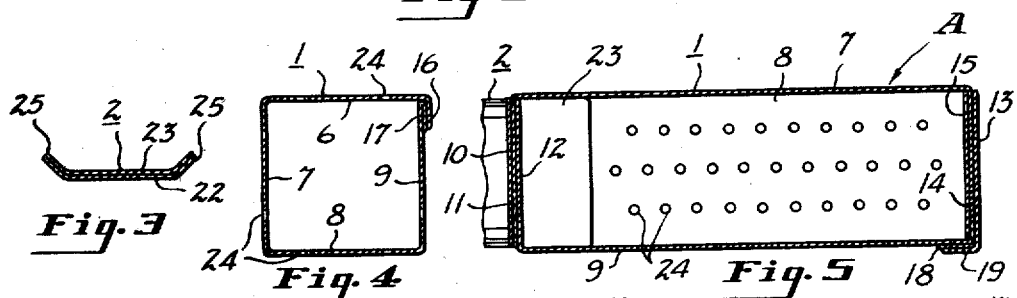
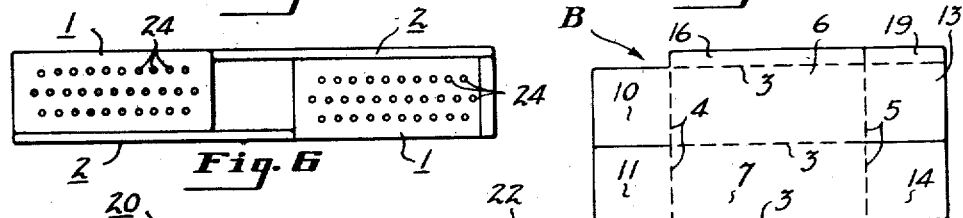
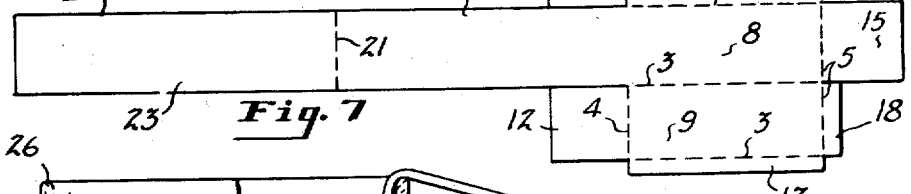
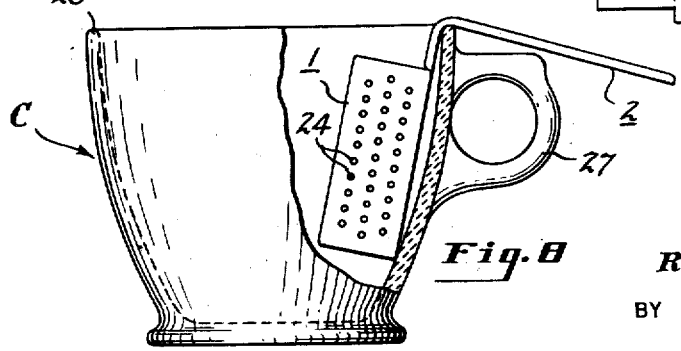
INVENTOR
Ralph M. Kovel
BY Evans & Meloy
ATTORNEYS

# United States Patent Office 2,805,162
Patented Sept. 3, 1957

2,805,162

TEA PACKAGE

Ralph M. Kovel, Shaker Heights, Ohio

Application October 25, 1954, Serial No. 464,214

2 Claims. (Cl. 99—77.1)

The present invention relates to packages or containers for tea leaves or the like, and more particularly to a tea package having a stirring handle which is readily bendable to form a supporting hook for the package.

Heretofore tea bags and other previous tea containers have been supported from tea pots by strings, cords and similar flexible strips which do not have the rigidity desirable for imparting a stirring motion to the container in a tea cup. The rigid handles on tea spoons, on the other hand, were unsuitable for tea containers since they could not be readily suspended from a tea pot or a tea cup.

According to the present invention a tea container is formed from inexpensive perforated metal foil and is provided with an integral stirring handle which has sufficient rigidity for stirring and which may be easily bent with the fingers of one hand around the lip of a tea cup to form a supporting or retaining hook. The handle is preferably formed of at least two thicknesses of metal foil so that it may have the desired rigidity even where the foil is relatively thin. The main portion of the container connected to the handle preferably has a height less than about three inches and a maximum width less than about one inch so that it will fit in a standard tea cup and may be easily moved therein for stirring the contents.

An object of the present invention is to provide a combined tea container and stirring device which can be readily manufactured at a minimum cost.

A further object of the invention is to provide a tea container which has a stirring handle and which may readily be supported from the edge of a tea pot or a tea cup.

A still further object of the invention is to provide metal tea containers which may be stacked and stored in a rectangular space of minimum volume and which may be packaged in convenient quantities in small boxes.

Other objects, uses and advantages of the present invention will become apparent from the following description and from the drawings in which:

Figure 1 is a side elevational view of the tea container of the present invention;

Figure 2 is a top view of the container shown in Fig. 1 and on the same scale;

Figure 3 is a vertical sectional view of the stirring handle on an enlarged scale taken substantially on the line indicated at 3—3 in Fig. 1;

Figure 4 is a vertical sectional view of the tea container on the same scale as in Fig. 3 and taken substantially on the line indicated at 4—4 in Fig. 1;

Figure 5 is a fragmentary horizontal sectional view of the tea package on the same scale as Figs. 3 and 4 and taken substantially on the line indicated at 5—5 in Fig. 1;

Figure 6 is a side elevational view on a smaller scale showing how the tea packages may be stacked;

Figure 7 is a top plan view of the metal blank from which the tea container is formed; and Figure 8 is a side view of a tea cup with a portion thereof broken away to show how a tea container is suspended therein.

Referring more particularly to the drawings in which like parts are identified with the same numerals throughout the several views, Figs. 1 to 5 show a tea package or container A comprising a perforated main body portion 1 and a handle portion 2 integrally connected thereto. The body portion is preferably of a size convenient for stirring within a standard tea cup and the handle portion preferably has sufficient length to project above the top of the tea cup so that it may easily be gripped by the hand when the body portion is submerged in water within the cup and has sufficient rigidity for stirring. The handle portion 2 is preferably constructed of a bendable material such as aluminum or other suitable metal so that it may be bent and hooked over the top edge of a tea pot or tea cup to support the container and the contents thereof.

In order to form an inexpensive tea package which may be discarded after use like an ordinary tea bag, it is preferable to form the tea container of the present invention from very thin sheets of metal or from metal foil. The handle portion 2 is preferably integral with the body portion 1 so as to avoid the expense of special connections between said portions to provide the rigidity necessary for stirring.

As herein shown, the body portion 1 of the tea package is in the form of an elongated rectangular parallelepiped of a size convenient for stirring in an ordinary tea cup having a diameter at its upper edge of around three or four inches and a depth of around three or four inches.

The tea container illustrated in the drawings is formed in one piece from a blank B of aluminum foil or the like having longitudinal fold lines 3 and transverse fold lines 4 and 5 defining four rectangular side walls 6 to 9, inclusive. Top and bottom end flaps 10 to 15, inclusive, are hinged to the side walls along the transverse fold lines 4 and 5 and side tabs 16 and 17 are hinged to the walls 6 and 9 along the longitudinal fold lines 3 thereof. An end tab 18 is hinged to an end of the side wall 9, and a side tab 19 is hinged to the side of the end flap 13.

The end flaps and the side and end tabs are shown herein as being rectangular and extending the full length of the fold lines along which they are hinged. Since the side walls 6 to 9 are shown herein as being of the same width, the end walls of the tea box formed from the blank B are square and the end flaps 10 to 15 are preferably substantially square.

The blank B is cut to provide a longitudinally elongated rectangular strip 20 integral with and having the same width as the side wall 8. The strip is divided by a transverse fold line 21 into inner and outer rectangular panels 22 and 23. The outer panel has a length greater than that of the inner panel so that the end of the outer panel projects into the body portion 1 as shown in Fig. 5 when the strip 20 is bent back upon itself.

The tea package is formed by bending the strip 20 along its fold line 21 until the panels 22 and 23 are in face to face contact and by folding the blank to form a rectangular box with the end flaps in superposed relation as shown in Fig. 5. Before both ends of the box are assembled, the box is partially filled with tea leaves. The tabs 16 and 17 and the tabs 18 and 19 are bent against the side wall 9 as shown in Figs. 4 and 5 to complete the box after the end flaps have been arranged from the end walls of the box. The flaps and tabs may be securely held in position by crimping, by employing staples or suitable adhesives, such as those approved for use in sealing food containers, or in any other suitable manner. It will be understood that the blank B shown herein and the tea box formed therefrom are intended merely to illustrate the principle of the present invention and that similar boxes may be formed in various other ways.

It will be noted that the end of the panel 23 projects into the shell or receptacle formed by the side and end walls of the tea package and is held against the side wall 8 by the end flaps 10, 11 and 12 as best shown in Fig. 5.

The side and end walls of the main body portion 1 may be perforated to permit hot water in a tea cup or tea pot to enter the tea package when it is submerged. However, the handle portion 2 is preferably imperforate. As herein shown, each of the side walls 6 to 9 has three rows of perforations 24 through which the hot water may freely penetrate to reach the tea leaves held within the container. The perforations may be of such size and number to promote quick steeping or infusion of the tea leaves without causing the tea leaves to drop from the container.

The blank B is preferably formed from a metal foil which is substantially non-corrosive when submerged in hot water. For the purposes of this application, it will be understood that the term "foil" covers a sheet of metal having a thickness from about .001 to about .007 inch.

Best results are obtained by forming the blank B from aluminum foil and such foil preferably has a thickness from about 0.002 to 0.005 inch. While various aluminum alloys are suitable, it is preferable to employ foil composed of at least about 99 percent aluminum plus minor impurities therein. Good results are obtained with hard cold-rolled aluminum foil that has not been annealed. The hard foil is usually preferred since it has stiffness needed for the handle portion 2, yet may be bent if desired.

Since the foil is preferably very thin to minimize the cost of the metal in the tea container A, the handle portion 2 is preferably reinforced to obtain the rigidity desirable for stirring. Such rigidity may be obtained by increasing the number of layers of metal foil in the handle portion (for example, by increasing the length and/or width of the strip 20 and folding it more than one time), by corrugating the handle portion longitudinally, or by otherwise forming longitudinal reinforcing flanges and/or ribs.

It is preferable to provide the handle portion 2 with longitudinal rib-like reinforcing projections so that the handle portion has sufficient rigidity to serve as a cantilever for imparting a stirring motion to the body portion 1 when it is submerged in water without bending substantially during such stirring. As herein shown, such projections are provided by bending the marginal side portions of the handle upwardly to form upwardly inclined longitudinal marginal reinforcing flanges 25 extending the full length of the handle.

The reinforcing flanges provide the handle portion 2 with sufficient rigidity to prevent noticeable bending during stirring. However, the thin metal of said handle portion may be bent readily by the fingers of one hand to form a supporting or retaining hook.

Figure 8 shows a standard type of circular tea cup C having an internal diameter of about two to four inches throughout its height and decreasing in diameter towards its bottom. The cup has a circular lip 26 at its upper edge with a diameter from about three to four inches and a conventional handle 27. The height of such a standard cup is usually about three to four inches.

The dimensions of the tea package or container A are preferably selected so that the container is readily received in the standard size tea cup and may be easily stirred in the cup. The handle portion 2 therefore is provided with a length sufficient to project above the top of the cup when the body portion 1 is submerged in the liquid in the cup. In order to facilitate stirring, the body portion 1 is elongated and the maximum width thereof is preferably less than about one inch. Best results are obtained when the body portion is about one-half inch square or smaller.

In order to provide sufficient tea leaves for steeping a cup of tea and to provide sufficient space for expansion of the leaves as they are wetted, the volumetric capacity of the tea package is about one-quarter to two cubic inches and preferably about three-eighths to one cubic inch.

The height or length of the elongated body portion is usually less than about three and one-half inches so that said portion may be completely submerged in a tea cup. The preferred length is greater than one but no greater than about three inches.

The strip 20 preferably has a length greater than about three inches and sufficient so that the handle portion 2 projects from about one to three inches beyond the body portion 1. The width of the handle portion within about one inch of the body portion is preferably less than about one inch and not substantially greater than the maximum width of said body portion so that the handle will not interfere with stirring by engaging the cup. The handle portion also preferably has sufficient layers of metal foil so that the total metal thickness of the handle is at least about 0.005 inch or so in order that the handle may have sufficient rigidity for stirring and for supporting the tea container and its contents when hooked over the edge of a tea pot or tea cup. It will be understood that such thickness may have to be increased where soft or annealed metal is used or where the tea container is formed by drawing or various other processes which do not employ foil.

In order to facilitate nesting and packaging of the tea packages of the present invention in a rectangular space of minimum size, it is preferable to provide the handle portion 2 with a width substantially equal to or less than that of the main body portion 1 and with a length from about two-thirds to one and one-half times that of said body portion. The tea packages may be stacked as shown in Fig. 6 with the body portion of one tea package engaging the handle portion of the next adjacent tea package. Where the handle portions of the tea packages have the same widths and lengths as the body portions, the packages may be stacked most efficiently. An excellent tea container may be made with a body portion one-half inch square and two and one-half inches high and with a handle portion one-half inch wide and two and one-half inches long. It will be apparent how such tea containers may be packed in small rectangular boxes having a volume only slightly greater than the total internal volume of the tea containers therein.

Since the stirring handles of the tea containers are constructed of aluminum foil or similar thin metal which can be readily bent with the fingers beyond their elastic limit and permanently deformed, it is a simple matter to attach the tea containers of the present invention to tea cups or tea pots. After the stirring motion has been imparted to the tea-containing body portion 2 of the container by the flanged stirring handle 2, the handle may be bent and hooked over the lip 26 as shown in Fig. 8. When the handle is bent sharply it will be permanently deformed even though hard aluminum foil is used which has considerable elasticity. The handle may be bent to provide a supporting hook having sufficient stiffness and rigidity to support the container A and the contents thereof at any desired height from the edge of the cup C, or from a glass or even a conventional tea pot.

Where the tea container A has sufficient length or height so that the handle projects above the cup when the tea container is resting upon the bottom of the cup, the handle may be bent to form a retaining hook to hold the tea container in place in the cup. In such a case, the container would be supported by the bottom of the cup and not by the handle.

It will be apparent that the tea container of the present invention is convenient for steeping tea in pots, glasses, and cups of various sizes and that the stirring handle may be bent to any desired shape so as to support or retain the tea container in the desired position.

While the tea container of the present invention is illustrated herein the form of a rectangular parallelepiped particularly well suited for packaging, it will be understood that the tea-receiving portion of the container may have various other shapes and may be formed by various methods. While the containers of this invention are preferably formed from inexpensive foil, it will be understood that drawn metal containers and other types of containers may be employed having stirring handles of the type disclosed herein. While such other types of containers may require a greater weight of metal than that required for folded box-like containers of the type shown herein, savings in the cost of production of such other types may offset the increased cost of the material which may be required.

It is to be understood that in accordance with the provisions of the patent statutes, variations and modifications of the specific devices herein shown and described may be made without departing from the spirit of the invention.

Having described my invention, I claim:

1. A combined tea leaf container and stirring device comprising a perforated, thin metal foil box of a size to be received in a tea cup and having six side walls disposed to form a rectangular parallelepiped, tea leaves being contained in said box, an elongated strip of thin metal foil integrally connected to a side wall of said box and extending from one end of the box and normally coplanar with said side wall thereof, said strip having a width not greater than that of said side wall and a length from about two thirds to one and one half times the length of said side wall, whereby a plurality of containers of the same size and shape as said container may be stacked for packaging in a minimum space, said strip constituting a handle and having sufficient rigidity to serve, in its normally extending relationship with said box, as a stirring handle cantilever and being easily deformable by hand to a hook shape.

2. A combined tea leaf container and stirring device comprising a perforated, thin metal foil box of a size to be received in a tea cup and having six side walls disposed to form a rectangular parallelepiped, tea leaves being contained in said box, an elongated strip of thin metal foil integrally connected to a side wall of said box and extending from one end of the box and normally coplanar with said side wall thereof, said strip having a width not greater than that of said side wall and a length from about two thirds to one and one half times the length of said side wall, whereby a plurality of containers of the same size and shape as said container may be stacked for packaging in a minimum space, said strip being bent back upon itself and bent laterally along its length to form a double thickness handle having inclined longitudinally by extending reinforcing margins providing the handle with sufficient rigidity as a cantilever for manipulating the box in water with a stirring action while being easily deformable by hand to a hook shape.

References Cited in the file of this patent

UNITED STATES PATENTS

| Number | Name | Date |
|---|---|---|
| 1,313,582 | Cowan | Aug. 19, 1919 |
| 1,483,015 | Schnackenberg | Feb. 5, 1924 |
| 1,555,515 | Peal | Sept. 29, 1925 |
| 1,576,735 | Fessenden | Mar. 16, 1926 |
| 1,747,596 | Peal | Feb. 18, 1930 |
| 2,092,510 | Hart | Sept. 7, 1937 |
| 2,192,605 | Salfisberg | Mar. 5, 1940 |
| 2,291,278 | Cleaves | July 28, 1942 |
| 2,362,459 | Barnett | Nov. 14, 1944 |

FOREIGN PATENTS

| Number | Country | Date |
|---|---|---|
| 482,426 | Great Britain | Mar. 29, 1938 |
| 251,339 | Switzerland | July 16, 1948 |

UNITED STATES PATENT OFFICE

CERTIFICATE OF CORRECTION

Patent No. 2,805,162 September 3, 1957

Ralph M. Kovel

It is hereby certified that error appears in the printed specification of the above numbered patent requiring correction and that the said Letters Patent should read as corrected below.

Column 6, line 16, strike out "by".

Signed and sealed this 22nd day of October 1957.

(SEAL)
Attest:
KARL H. AXLINE
Attesting Officer

ROBERT C. WATSON
Commissioner of Patents